(12) United States Patent
Fischer et al.

(10) Patent No.: US 12,047,771 B2
(45) Date of Patent: Jul. 23, 2024

(54) KEY NEGOTIATION AND PROVISIONING FOR DEVICES IN A NETWORK

(71) Applicant: NAGRAVISION SA, Cheseaux-sur-Lausanne (CH)

(72) Inventors: Jean-Bernard Fischer, Rochejean (FR); Frederic Thomas, Cheseaux-sur-Lausanne (CH); Fabien Gremaud, Cheseaux-sur-Lausanne (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 508 days.

(21) Appl. No.: 17/298,035

(22) PCT Filed: Dec. 2, 2019

(86) PCT No.: PCT/EP2019/083315
§ 371 (c)(1),
(2) Date: May 28, 2021

(87) PCT Pub. No.: WO2020/109624
PCT Pub. Date: Jun. 1, 2020

(65) Prior Publication Data
US 2022/0104011 A1    Mar. 31, 2022

(30) Foreign Application Priority Data

Nov. 30, 2018 (EP) .................................. 18209647

(51) Int. Cl.
*G06F 21/00* (2013.01)
*H04W 12/03* (2021.01)
(Continued)

(52) U.S. Cl.
CPC ....... *H04W 12/0431* (2021.01); *H04W 12/03* (2021.01); *H04W 12/0433* (2021.01); *H04W 12/06* (2013.01)

(58) Field of Classification Search
CPC ............. H04W 12/0431; H04W 12/03; H04W 12/0433; H04W 12/06
See application file for complete search history.

(56) References Cited

U.S. PATENT DOCUMENTS

| 2008/0115203 A1 | 5/2008 | Elzur |
| 2008/0235508 A1* | 9/2008 | Ran ..................... H04L 63/0428 713/151 |

(Continued)

FOREIGN PATENT DOCUMENTS

EP    4175230 A1 *  5/2023    ............. G06F 21/44

OTHER PUBLICATIONS

Badra M et al: "A now secure session exchange key protocol for wireless communications", Personal, Indoor and Mobile Radio Communications, 2003. PIM RC 2003. 14th IEEE Proceedings on Sep. 7-10, 2003, IEEE, Piscataway, NJ, USA, vol. 2, Sep. 7, 2003 (Sep. 7, 2003). pp. 2765-2769.

(Continued)

*Primary Examiner* — Kendall Dolly
(74) *Attorney, Agent, or Firm* — POLSINELLI LLP (57) ABSTRACT

The present disclosure proposes method and systems for establishing secure communication session (s) between a first device and a second device, where the first device operates in a user network and implements a first key exchange protocol for secure communication. The second device is capable of communicating with the first device over a wireless communication network. The second device implements a second key exchange protocol that is different to the first key exchange protocol for secure communication. A proxy entity configured for implementing the first and the second key exchange protocols for secure communication is provided. The proxy entity is configured for generating and/or provisioning one or more session keys for the first and the second devices using the key exchange protocols (Continued)

specific to each device for establishing secure communication between the first and second device based on the generated session key(s).

19 Claims, 6 Drawing Sheets

(51) Int. Cl.
*H04W 12/0431* (2021.01)
*H04W 12/0433* (2021.01)
*H04W 12/06* (2021.01)

(56) References Cited

U.S. PATENT DOCUMENTS

2017/0034284 A1* 2/2017 Smith ................... H04L 9/0825
2019/0245682 A1* 8/2019 Alwen .................. H04L 9/3247

OTHER PUBLICATIONS

Gupta V et al: "Experiments in wireless internet security", Wireless Communications and Networking Conference, 2002. WCNC2002. 200 2 IEEE, Piscataway, NJ, USA.IEEE, vol. 2, Mar. 17, 2002 (Mar. 17, 2002), pp. 860-864.

* cited by examiner

KEY NEGOTIATION AND PROVISIONING FOR DEVICES IN A NETWORK

FIELD

The present disclosure relates to communication protocols for authentication and/or cryptographic purposes for one or more devices in a user network. In particular, the present disclosure discusses key exchange and/or negotiation processes for secure communications for one or more devices in a network.

BACKGROUND

The Internet of Things (IoT) is a network of devices that allow the direct integration of the physical world with computer-based systems and networks. The devices are generally considered to be physical devices that have unique identifiers and are in most cases embedded with electronic sensors and/or actuators to monitor specific kinds of data. The devices are typically connected with private and/or public networks, which allow the live transfer and exchange of data with other connected devices and servers. A primary application of an IoT network is an automated system whereby information from the physical world can be stored, accurately monitored and processed for real-time decisions. The key to IoT implementation is the interconnectedness of devices. Existing frameworks for enabling an IoT network of devices provide a software platform that can automatically organise communication between devices and networks, as well as manage security, privacy, data storage and bandwidth available for the connected devices. These requirements are generally met by predefined protocols in each IoT framework. In practice, this means that an IoT system can comprise millions of devices that communicate between themselves and other networks. Some examples of existing IoT frameworks include RTI™, Microsoft Azure™ IoT, Cisco™ IoT Cloud and the like.

Integrating and registering and/or authenticating several devices for connection to an IoT network requires a significant amount of manual or automated functions to register each device in the IoT network, generally for security reasons. This typically includes input of device credentials, network passwords, session keys for communication between IoT devices, authentication keys/codes and other security parameters. IoT frameworks employ known secure authentication and/or key exchange mechanisms for integrating or authenticating a device with an IoT server or hub, so that one or more sessions can be set up, or requests can be received to operate in or request a service from a device within an IoT network. However, many IoT devices today tend to be low order devices, i.e. devices with low power consumption that may, for example, be able to function on a small battery for many months and/or have reduced storage and/or use a limited communication bandwidth. Such low order devices are usually incompatible with multiple and/or complex key exchange mechanisms or authentication schemes for ensuring that communication to and from the devices are secure. Existing and well established secure key provisioning for authenticating the origin of and/or securing certain communications for devices in a network utilise transport layer security (TLS) protocol, which is reliable, end to end and compatible with most well-established networks, such as the Internet. However, low order devices do not usually have the processing or networking power or capability to properly handle such complex key negotiation schemes without overreaching in terms of their processing, network and physical limitations, thereby potentially damaging such devices and/or causing breaches in security of authentication or key exchanges/negotiations because some aspects of the existing schemes cannot be handled by such low order devices. Thus, secure key negotiation techniques that are suitable for all type of devices, including low order IoT devices are needed.

DETAILED DESCRIPTION

In overview, aspects of the disclosure provide secure key exchange or negotiation techniques for one or more devices in a user network.

The user network may be an IoT network that includes a plurality of devices communicatively coupled to a control server. One or more of the plurality of devices in the user network may be a low order device that does not usually operate in other large or complex networks such as the Internet, and thus may not be compatible with one or more secure protocols associated with such other network. Low order devices may be devices such as a control switch, a stand-alone display, lighting module, speaker, key fob or plug etc. that may have limited or even minimal processing, power and/or bandwidth resources for reliably functioning within the user network, such as a home or office IoT network. Low order devices consume low power and/or bandwidth when compared to high order devices that may be operating in or outside the user network such as computers, tablets, mobile phones and set top boxes. High order devices are those that may be traditionally or sometimes even as a standard configured to fully operate with or using one or more other larger networks (besides the user network) like the Internet or another Local or Wide area network. Such high order devices will thus regularly be operating using Internet-compatible communication protocols such as TCP/IP or UDP or other packet-based network protocols for communication and applying known cryptographic protocols such Transport Layer Security (TLS) protocol or Secure Sockets Layer (SSL) or Hypertext Transfer Protocol Secure (HTTPS) over the Internet for secure transmissions and communications, such as for session authentication, key exchange and/or negotiation, authorisation of operations etc. The power consumption, storage and bandwidth utilised by or associated with the operation of such high order devices can be several magnitudes higher than low order devices. A typical single session initialisation or key exchange process using TLS can, for instance, use more power or bandwidth than a typical low order device for its data transmission in a day or even weeks/a month. The present disclosure thus recognises the importance and the need for alternative, and in some cases, ad-hoc authentication and/or secure key and/or negotiation exchange protocols for such low order devices that are not based on existing cryptographic protocols used for the Internet, such as TLS, HTTPS or other complex key negotiation mechanisms. This is especially the case when the low order devices need to participate in key negotiation with one or more high order devices that are either within the user network or outside the user network to establish one or more secure sessions for communication with them. In many cases, the low order devices in the user network may need to participate with servers such as key management servers or Internet servers etc. that are outside of (not part of) the user network in order to obtain keys or codes or other data that is necessary for authentication etc. to establish secure communication sessions.

Internet servers or other servers that are outside the user network may also be associated with the high order devices operating within the user network. In this case, the Internet servers may be the entities responsible for all communications to/from/for the high order devices in the user network. Therefore, these Internet servers are the entities that would need to communicate or interact with the low order devices in the user network for any communications that deal with keys or code establishment and exchange etc. In some cases, such servers may be operating in the user network and may be one of the high order devices in the user network. Such Internet servers, whether insider or outside the user network are not pre-configured to handle alternative or ad-hoc protocols. Furthermore, while it is in theory possible, configuring each such server that is or is associated with the high order devices in the user network for each alternative or ad-hoc protocol that suits best for one or more low order device or each type of type of low order device in the user network is simply not practically feasible or scalable.

Accordingly, aspects of the present disclosure propose key generation and exchange, sometimes referred to herein as key negotiation processes, to ensure security for a number of necessary mechanisms in the user network, such as authentication of devices, key provisioning for specific devices—key exchange protocols—based on providing a proxy entity between a high order device operating within or outside the user network such as one or more Internet servers, and one or more low order devices operating within the user network. Such aspects, although not limited to, relate to authentication or key negotiation and provisioning processes or mechanisms for which cryptographic or security protocols are required due to the importance and/or sensitivity of the data that is to be transferred for such processes. Such mechanisms require secure and sometimes end to end communication channels for one or more communication sessions. Thus, in some embodiments, once the authentication or key provisioning is complete for a session for transmission involving the low order and the high order device, the session or transmission may then continue using standard communication protocols, such as the Internet-compatible protocols like TCP/IP, HTTP etc. used by most devices (high or low order) for communication.

Aspects of the present disclosure relates to a method of establishing secure communication or establishing a secure communication session between a first device and a second device, where the first device operates in a user network and implements a first key exchange protocol for secure communication. The second device can communicate with the first device over a wireless communication network, where the second device implements a second key exchange protocol that is different to the first key exchange protocol of the first device for its secure communication. In some embodiments the secure communication is or includes communications where secure data such as encryption/decryption keys or codes are to be exchanged between the devices. In some embodiments, the first and second key exchange protocols are only used for secure communications that require authentication or cryptographic keys or data. In related embodiments, other communications between the first and second devices, besides secure communications, take place using the wireless communication network, which may be the Internet, or any other local or wide area network (LAN, WAN) based on Internet related communications such as HTTP, TCP/IP, UDP etc. In other embodiments, the first and second key exchange protocol may be used for other communications too, besides the above mentioned secure communications. In some embodiments, the user network may be a private or home network such as an IoT network including a plurality of devices and a control server, where the devices in the user network can communicate with each other and the control server and any devices outside the user network via a communication network such as the Internet. In some embodiments, the first device may be a low order device and the first key exchange protocol may be a lightweight cryptographic protocol that utilizes low power and bandwidth for secure communication, such as stream ciphers, block ciphers, hash functions etc. that utilize low computing power. In some embodiments, the second device may be a high order device and the second key protocol is an Internet based cryptographic protocol such as TLS, SSL or HTTPS that consume much more power, network bandwidth and processing resources when implemented.

A first aspect relates to methods for establishing secure communication, where the proxy entity is visible to both the first and the second device and all communication between the first and second device is via the proxy entity. The methods of the first aspect comprise providing a proxy entity that is configured for implementing both the first and the second key exchange protocols for secure communication sent and received from/at the proxy entity. In some embodiments, the proxy entity may be a computing device with one or more processors associated with a memory. In some embodiments the proxy entity is configured to represent the first device and/or the second device for one or more secure communications. The method of the first aspect includes the proxy entity implementing the following functions. The proxy entity negotiates a first device key for the first device using the first key exchange protocol and negotiates a second device key for the second device using the second key exchange protocol. In some embodiments, negotiating the first/second device keys may include obtaining and/or generating and/or authenticating the first/second key using or based on the respective key exchange protocol. A first session key for the first device and a second session key for the second device is then computed by the proxy entity. In some embodiments, the first and second session keys may be the same, but provided or provisioned, i.e. made available to the first and second devices using the respective first and second key exchange protocols. In other embodiments, the first and second session keys are different and specific to the respective first or second device. Once the respective session keys have been provisioned, encrypted data from the first device is received at the proxy entity, the data encrypted with the first session key. This data is then decrypted using the first session key. The proxy entity then re-encrypts the data using the second session key before sending it to the second device. In some embodiments, the first and second devices have already been provisioned with their respective session keys and therefore encrypted data received at the first and/or second device can be decrypted using the respective session key. The method of the first aspect then includes receiving further data encrypted with the second session key from the second device using the second key exchange protocol and decrypting the further data using the second session key. The further data is then re-encrypted using the first session key and sent to the first device. In some embodiments, subsequent data transferred between the first and the second device will be encrypted using the first session key between the first device and proxy entity and encrypted using the second session key between second device and the proxy entity. In related embodiments such encrypted data and further data may be sent/received using one or more communication protocols associated with the wireless communication network, such as the Internet other than the first and second key exchange protocols. In some embodiments network addresses for the first device and the second device will be redirected to and managed by the proxy entity and each device will therefore be assigned different network addresses that are associated with the proxy entity.

Advantageously, providing a proxy entity between a first device and a second device enables secure authentication and/or encryption/decryption key provisioning or installation even though the first and the second device use different and/or incompatible secure communication protocols for transferring or exchanging such keys. This is particularly advantageous when a low order device—first device—functioning in a user network, such as an IoT network needs to be securely provisioned with relevant data or keys to be able to establish a secure communication session with a high order device—second device—that may be operating outside the user network, or even within the user network that uses different and more complex (processing and network bandwidth intensive) key provisioning and exchange protocols. If a low order IoT device is forced to operate with standard WAN or Internet protocols such as TLS or HTTPS, this will place a large computational, power and/or bandwidth consumption burden on the low order device. Thus, providing a proxy entity that can implement both the first and the second key exchange protocol presents an impersonation of the first device to the second device to negotiate, compute and provision keys for authenticating a communication session on behalf of the first device, and vice versa. As the proxy entity is also configured to use the first key exchange protocol, secure communications to provision session keys for the first device using the proxy entity can be done using lightweight or ad-hoc protocols that do not stretch the power and computational resources of the first device, such as stream/block ciphers, hash functions etc. This way, all further communication between the two devices can take place via the proxy entity secured using the respective session keys for each device. This aspect is a useful implementation when a single end to end session is not suitable or cannot be established between the first and second device. This may be because, for instance, the communication protocols associated with the wireless communication network do not work with the first device, which means that the first device will be unable to manage any communication protocol associated with the second device, not just secure communications, i.e. cryptographic protocols. As network addresses for the first device and the second device will be redirected to and handled by the proxy entity, these addresses will be different to the originally assigned addresses within the user network or the wireless communication network. In some embodiments, for the first aspect the proxy entity is configured to scale with the number of devices (such as the low order first devices) that wish to securely communicate with second devices having incompatible communication protocols, as well as the amount of network traffic between each device pair. Advantageously, the first device which is a low order device does not have to implement any Internet-friendly protocols and can use only lightweight protocols to communicate with all other devices inside and outside the user network via the proxy entity. Also, advantageously in some embodiments the proxy entity can be configured to implement additional features like monitoring of traffic and data between the devices. This is because all communication goes through the proxy entity.

A second aspect relates to methods for establishing secure communication, where the proxy entity is visible to both the first and the second device and secure communications such as key provisioning for encryption, decryption and/or authentication between the first and second device take place via the proxy entity. Once provisioned, subsequent communication takes place securely using the provisioned keys over or via the wireless communication network. The methods of the second aspect comprise providing a proxy entity that is configured for implementing both the first and the second key exchange protocols for secure communication sent and received from/at the proxy entity. The proxy entity negotiates a first device key for the first device using the first key exchange protocol and negotiates a second device key for the second device using the second key exchange protocol. In the second aspect, the described method includes sending a request encrypted with the second device key to the second device using the second key exchange protocol, the request including or being a request for establishing a secure communication session with the first device. In some embodiments, the request includes device specific data relating to the first device with which the secure communication session is to be established. In related embodiments the device specific data may relate to the network ID or device ID or network address of the first device and/or the user network within which the first device operates. The method then includes negotiating a session key encrypted with the second device key from the second device using the second key exchange protocol, the session key being associated with the first device. In some embodiments, the association with the first device is based on the device specific data in the request sent to the second device. In some embodiments, the session key is computed by the second device upon receipt of the request and sent to the proxy entity. In some embodiments generating the session key also includes generating a secure communication session that is passed to the proxy entity, so that the proxy entity can push the generated session and/or session key to the first device. The method of the second aspect includes decrypting the session key using the second device key and re-encrypting the session key using the first device key, before sending the session key encrypted with the first device key using the first key exchange protocol to the first device. Once the session key is securely provisioned at the first device, a secure communication session can then be initialized or established over the wireless communication network for data transfer between the first device and the second device using the session key. In some embodiments, all data transferred via the secure communication session is end to end encrypted with the session key that has been generated by the second device and provisioned at the first device using the proxy entity. In related embodiments, data transfer over the secure communication session takes place using standard or existing communication protocols associated with the wireless communication network, such as TCP/IP, UDP without requiring cryptographic protocols like TLS or HTTPS (although this is not precluded) if the wireless communication network is a WAN like the Internet, after the session key has been securely provisioned as set out above at the first and second devices.

Advantageously, the second aspect has some similar advantages as discussed above for the first aspect, i.e. enabling secure authentication and/or encryption/decryption key provisioning even though the first and the second device use different and/or incompatible secure communication protocols for transferring or exchanging such keys. The second aspect also enables the low order devices, such as first devices that are usually small IoT devices to participate in secure communications for provisioning authentication and encryption/decryption keys, without stretching the low order device's resources and without placing a large computational, power and/or bandwidth consumption burden on the low order device. The second aspect relates to the proxy entity pushing a session key negotiated with the second device onto the first device to advantageously enable end to end secure communication using the session key. The first device can then communicate with the second device with a communication session that is secured end to end by the session key over the wireless communication network. Thus, once the first device is provisioned with the relevant data, a secure end to end communication session using any communication protocol associated with the wireless communication network, such as the Internet can be established for all future communication, as long as the communication protocol is compatible with both devices. This is less resource, bandwidth and power expensive as there will be no need to use a cryptographic key exchange protocol involving the first device. Thus, to reduce the load on the first device, the key provisioning is performed by the proxy entity, before it hands over a communication session and/or the session key to the proxy entity. The second aspect is useful when the first device and the second device are both compatible with one or more communication protocols associated with the wireless communication network, so that an end to end secure session can be established using one of such protocols not requiring any further intervention from the proxy entity once the session key is established. In the second aspect and related embodiments, the proxy entity is visible to the second device for key provisioning or negotiation for authentication and encryption purposes and thus the second device is aware of the network address of the proxy entity and that all secure communication using the second key exchange protocol must be directed to the proxy entity, instead of the first device. After the session key has been generated or negotiated, the key is pushed to the first device and direct communication between first and second device can continue. Thus, advantageously the network addresses of the first and second devices may remain the same for the most communications and are only redirected or managed by the proxy entity for negotiation and provisioning of the session key.

A third aspect relates to methods for establishing secure communication where the proxy entity is visible to just the first device and is invisible to the second device and where secure communications such as key negotiation and provisioning for encryption, decryption and/or authentication between the first and second device take place via the proxy entity. Once provisioned, subsequent communication takes place securely using the provisioned keys over the wireless communication network. Like the second aspect, subsequent data transferred via the secure communication session is end-to-end encrypted with the provisioned keys. The methods of the third aspect comprise providing a proxy entity that is configured for implementing both the first and the second key exchange protocols for secure communication sent and received from/at the proxy entity. The proxy entity negotiates a first device key for the first device using the first key exchange protocol. The method then includes generating by the proxy entity a challenge that is meant for/directed to the second device, the challenge being associated with the first device. In some embodiments, the challenge is generated in response to a request received at the proxy entity from the first device using the first key exchange protocol. In related embodiments, the request includes device specific data related to the first device. In some embodiments, the challenge is a crypto challenge based on existing challenge-response authentication related protocols in which one party or device presents a question (the challenge) and another party must provide a valid answer (response) to be authenticated. For example, in its simplest form, the challenge-response protocol is password authentication, where the challenge is asking for the password and the valid response is the correct password. In related embodiments, data regarding valid challenge and response pairs may be stored at an authentication server or a control server associated with the user network or the wireless communication network, where such data may be provided upon registration of the first and second devices for the user network and/or the wireless communication network. The method then includes providing the generated challenge to the second device via the wireless communication network. The second device then generates a response to the challenge. Upon obtaining the response from the second device, the proxy entity generates a session key based on the response. In some embodiments, the generation of the session key is responsive to a valid response being identified in the obtained response. The validity of the response may be in some embodiments checked or verified based on the challenge-response pairs mentioned above that may be pre-configured or dynamically configured based on real time challenge-response authentication data generated for each session. The method then includes encrypting by the proxy entity the generated session key using the first device key and sending the encrypted session key to the first device using the first key exchange protocol. The first device then decrypts the encrypted session key using the first device key. A secure communication session over the wireless communication network for data transfer between the first device and the second device is then established using the session key. In some embodiments, data transfer over the secure communication session takes place using standard or existing communication protocols associated with the wireless communication network once the session key has been securely provisioned as for first and second devices.

Advantageously, the third aspect has some similar advantages as discussed above for the first and the second aspects, i.e. enables secure authentication and/or encryption/decryption key provisioning even though the first and the second device use different and/or incompatible secure communication protocols for generating, i.e. negotiating, and exchanging such keys. The third aspect also enables the low order devices, such as first devices that are small IoT devices to participate in secure communications for provisioning authentication and encryption/decryption keys, without stretching the low order device's resources and without placing a large computational, power and/or bandwidth consumption burden on the low order device. As with the second aspect, the third aspect also involves pushing a session key negotiated based on the second device onto the first device so that an end to end secure communication session is set up between the two devices, without any further interaction with the proxy entity once the keys are provisioned. Advantageously, the third aspect allows key establishment and negotiation to take place in situations where the proxy entity is invisible to the second device and is only visible to the first device. This may be when the proxy entity device is partially or fully integrated within the user network. This is particularly advantageous if for example the second device and/or the first device is/are only configured to communicate directly with the other device to engage in key establishment procedures or other communications. This may be the case if for instance the first and/or second devices, and particularly the second device outside the user network, is/are only allowed to address each other directly for most communications such as challenge-response authentication using the wireless communication network due to existing policies or restrictions. This is implemented in the third aspect by enabling a proxy entity to generate a challenge response authentication procedure, rather than directly requesting and negotiating a session key or a secure session set up from the second device. Thus, no readdressing or impersonation of the first device is required to be provided to the second device, which can continue to communicate with the first device in the user network to respond to the challenge.

The third aspect of the present disclosure may be implemented in at least two different ways. One implementation comprises the additional steps of receiving by the proxy entity from the first device using the first key exchange protocol, a request for generating a challenge for the second device. The proxy entity then generates a challenge for the second device and encrypts the challenge with the first device key. The encrypted challenge is then sent to the first device using the first key exchange protocol. The first device decrypts the challenge using the first device key and sends the decrypted challenge from the proxy entity to the second device using the wireless communication network. In some embodiments, since the challenge is decrypted the communication protocol used henceforth for sending it to the second device can be one associated with the wireless communication network, such as TCP/IP etc. and does not need to be a cryptographic protocol like TLS, although this is of course still possible for data communication. The method then includes generating by the second device a response to the challenge and sending the generated response to first device using the wireless communication network. The response is then encrypted by the first device using the first device key and sent to the proxy entity using the first key exchange protocol. The proxy entity then decrypts the encrypted response using the first device key, and then generates a session key based on the response.

Advantageously, the above implementation enables the crypto challenge as well as the session key to be computed at the proxy entity. This ensures that no additional security or computational resources are required at the first device, besides those needed for its normal operation and communications with the user network. Thus, the first device can communicate with the second device over the wireless communication network using standard non-cryptographic Internet protocols. Once the response to the challenge is received from the second device, the proxy entity device uses this to validly compute the session key.

Another implementation of the third aspect that is an alternative to but is related to the above discussed implementation provides a method comprising the additional steps of generating by the first device a first challenge for the second device and sending a first transmission including the first challenge to the second device over the wireless communication network, wherein all communication between the first and second device over the wireless communication network is intercepted by the proxy entity. In some embodiments, the communication protocol used for the first transmission is a non-cryptographic protocol such as TCP/IP that is associated with the wireless communication network. In some embodiments, the proxy entity is configured to be behaving as a "man in the middle" for intercepting all communication between the first and second devices and is further configured to modify or redirect such communication. The method then includes detecting by the proxy entity, the first challenge in the first transmission and generating a proxy challenge for the second device. The proxy entity then replaces the first challenge with the proxy challenge in the first transmission before it reaches the second device. The method includes generating by the second device a response to the proxy challenge and sending a second transmission including the response to first device using the wireless communication network. The proxy entity once again intercepts the second transmission, detects the response in the second transmission and then generates a session key for a secure communication session between the first and second device based on the detected response from the second device.

Advantageously, the alternative implementation of the third aspect provides the proxy entity as a man in the middle, whereby there is no need for the first or the second device to directly involve or address the proxy entity for the challenge/response authentication thereby making addressing and readdressing much simpler. This is because the proxy entity is making use of the first key exchange protocol to send an encrypted session key to the first device for further use. All other communications use the originally assigned addresses for the devices and the proxy entity.

In some embodiments, the second device is configured for operating in the user network and is therefore integrated within the user network as one of the high order devices. This makes addressing and readdressing simpler and more manageable as all devices will be registered with the same user network. In alternative embodiments, the second device is configured to operate outside the user network, communicating with the user network via a wireless communication network using communication protocols associated with the wireless communication network.

In some embodiments, especially related to the second and third aspects described above, the proxy entity is configured to be integrated within the user network, i.e. be part of the user network. This enables the proxy entity to be integrated within the user network making addressing and readdressing simpler and manageable for the proxy entity and the first device. In other embodiments the proxy entity is configured to operate outside the user network using communication protocols associated with the wireless communication network.

In some embodiments, first device is not compatible for operation based on the second key exchange protocol and second device is not compatible for operation based on the first key exchange protocol for secure communication. In alternative embodiments first device may be compatible for operation with second key exchange protocol but may be able to deliver unoptimized results or outcomes or may be able to function only for a limited duration or for a specific type of secure communication or data exchanged during the secure communication.

Aspects and embodiments of the present disclosure also relate to a proxy entity including one or more processors associated with a memory, the one or more processors configured to implement the method described above in relation to the first aspect.

Aspects and embodiments of the present disclosure also relate to a system for establishing a secure communication session between a first and second device over a wireless communication network, the system comprising the first device having at least one processor and functioning within a user network, the user network including a plurality of other devices, each device in the user network communicatively coupled with a control server. The system also comprises the second device having at least one processor and configured for communicating with the first device over a wireless communication network, and a proxy entity having at least one processor for managing key exchange and provisioning for secure communication between the first and second devices. The system is arranged for implementing the above discussed aspects and embodiments of the present disclosure.

In some embodiments, the user network is an IoT network that includes the first device, the first device being a low order IoT device. In some embodiments, the second device may be operating within or outside the IoT network and may be an Internet server or a key management server for the IoT network. In some embodiments, the IoT network includes a plurality of other low order and high order IoT devices coupled to the control server, the control server being an IoT hub.

Some specific components and embodiments of the disclosed method are now described byway of illustration with reference to the accompanying drawings, in which like reference numerals refer to like features.

Figure 1:
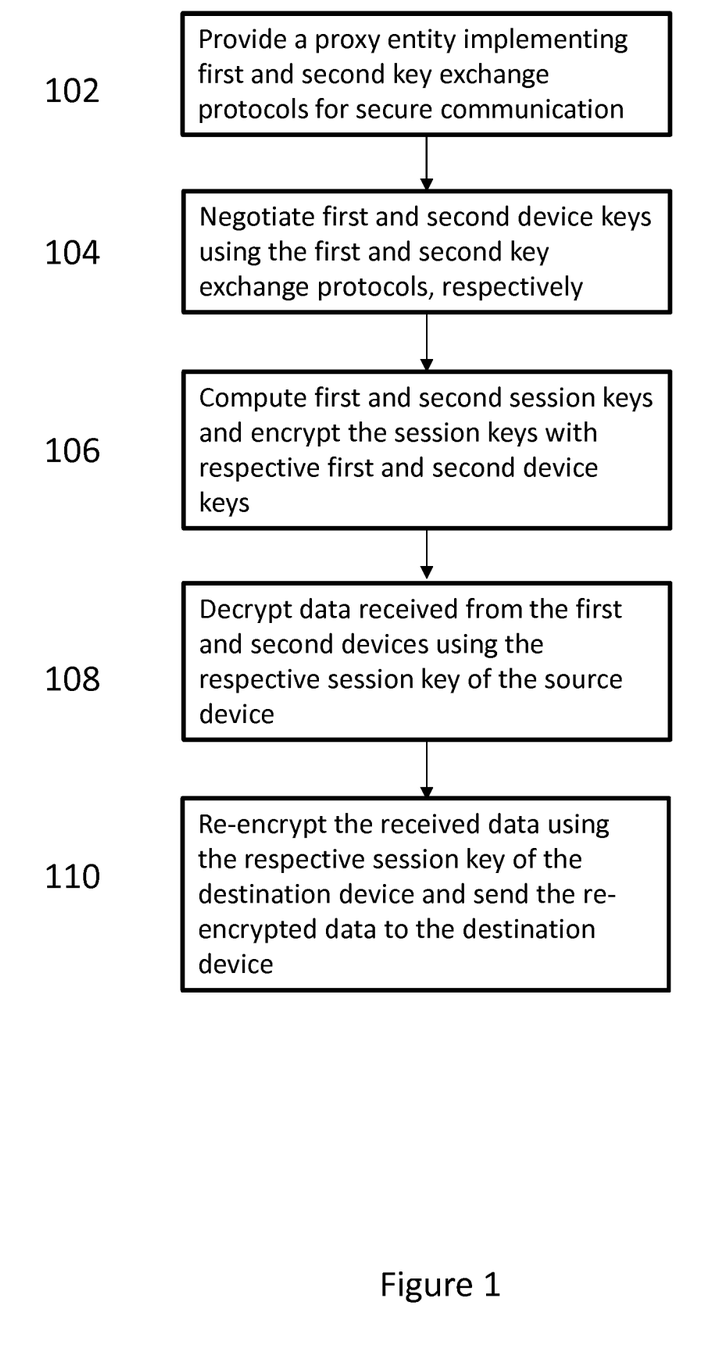
FIG. 1 is a flowchart illustrating a method for key negotiation in a user network according to a first aspect.
Figure 4A:
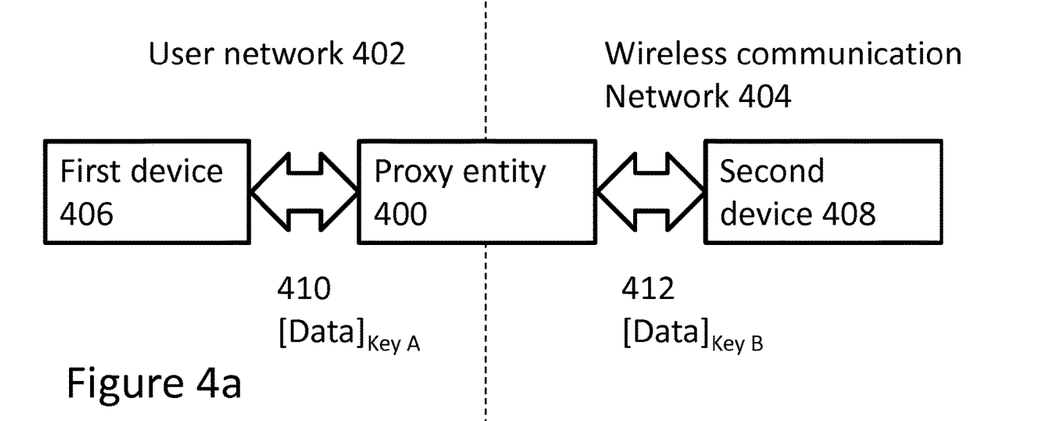
FIGS. 4a, 4b and 4c illustrate a system for key negotiation according to the first, second and third aspects, respectively.

FIG. 1 is a flowchart that depicts a method according to the first aspect and related embodiments for establishing secure communication, where the proxy entity is visible to both the first and the second device and all communication between the first and second device is via the proxy entity. A system for implementing FIG. 1 is seen in FIG. 4a and this system is also discussed herein.

As discussed above, the first aspect of the present disclosure provides a method of establishing secure communication between a first device 406 and a second device 408. In FIG. 1, the first device 406 is a low order device operating in a user network 402, such as an IoT network and implementing a first key exchange protocol 410 for secure communication. This may be a lightweight cryptographic protocol for negotiating and provisioning/installing keys for authentication/encryption/decryption etc. The second device 408 is capable of communicating with the first device 406 and other devices in the user network over a wireless communication network 404, such as the Internet. In some embodiments of FIG. 1, the first device 406 is either not compatible with any communication protocol, secure or unsecure, associated with the wireless communication network 404, or is compatible only when operating is a sub-optimal mode or for a very limited time, before reaching the limit of the low order first device's 406 resources. The second device 408 may be a high order device such as an Internet server or a key management server that implements a second key exchange protocol 412 that is different to the first key exchange protocol 410 for secure communication. The second key exchange protocol 410 may be an Internet related security protocol such as TLS or SSL or HTTPS for secure data or key negotiation or exchange. A proxy entity 400 is shown in FIG. 1 at a boundary of the user network 402 and the wireless communication network 404.

In step 102, a proxy entity 400 is configured for implementing both the first 410 and the second key exchange 412 protocols for secure communication. The proxy entity 400 is further configured for implementing the remaining steps of FIG. 1.

In step 104, a first device key is negotiated for the first device 406 using the first key exchange protocol 410 and a second device key is negotiated for the second device 408 using the second key exchange protocol 412. The device keys in FIG. 1 are used for encrypting all communications taking place between the proxy entity 400 and the respective devices 406,408 using the first and second key exchange protocols 410,412. The first and second device keys are not depicted in FIG. 4a, but they may be keys for known cryptographic mechanisms such as integer or non-integer symmetric or asymmetric keys that are suitable for the respective key exchange protocol.

In step 106, a first session key, key A, for the first device and a second session key, key B, for the second device is computed by the proxy entity 400. The proxy entity 400 is configured to be a computing device, such as a high order device that includes at least one processor associated with a memory. The computing of keys A and B may be implemented using one or more known methods such as those involving random number generation or secure key seeds for calculation of one or more predefined formulae based on information that may be provided to the proxy entity 400 for each of the first 406 and second devices 408. In some examples, key A may be computed using information based on the second device 408 or the second device key that is available to the proxy entity and vice versa for key B. This is to ensure additional security of the session keys A and B against any malicious attacks or eavesdropping by a third party or device.

In some embodiments, key A encrypted with the first device key is sent to the first device 406 using the first key exchange protocol 410, and key B encrypted with the second device key is sent to the second device 408 using the second key exchange protocol 412. Thus, FIG. 1 teaches the use of two different session keys for data transfer or communication henceforth between the first 406 and second device 408 and the proxy entity 400, irrespective of the protocol used for the communication.

In step 108, once the session keys A and B are installed or provisioned at the first and second device 406, 408 any data received from the first and second devices 406,408 are encrypted using the respective session keys A or B. The data may be received using any communication protocol that is compatible with the devices 406,408 and the proxy entity 400. There is no need to use the first and second key exchange protocols 410,412 as the session keys A and B have already been established and provisioned. In step 108 the received data is decrypted using the session key of the respective source device (this is the first or second device 406,408).

In step 110, the decrypted data that needs to be sent from the source to the destination device is then re-encrypted using the session key A or B, depending on whether the first device 406 or the second device 408 is the destination. The re-encrypted data is then sent to the destination device using any communication protocol that is suitable for the proxy entity 400 and the destination device.

Figure 2:
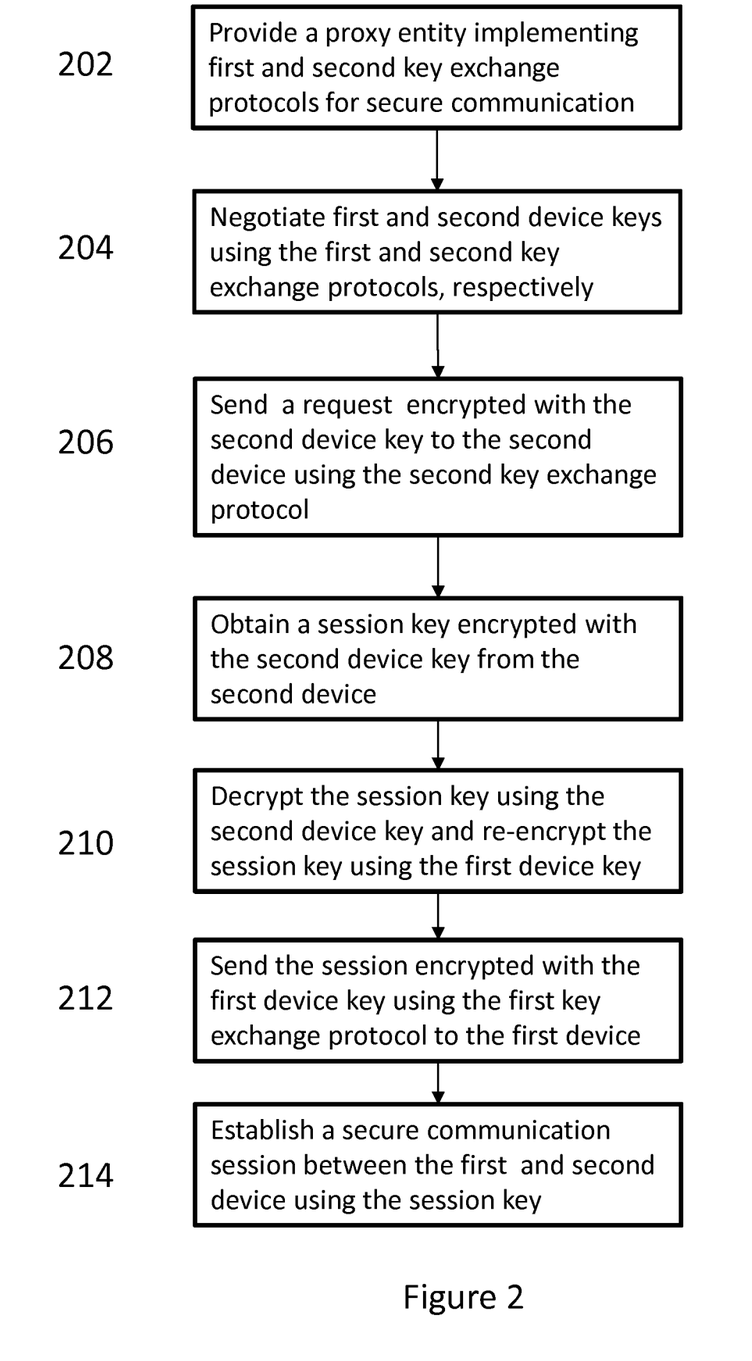
FIG. 2 is a flowchart illustrating a method for key negotiation in a user network according to a second aspect.
Figure 4B:
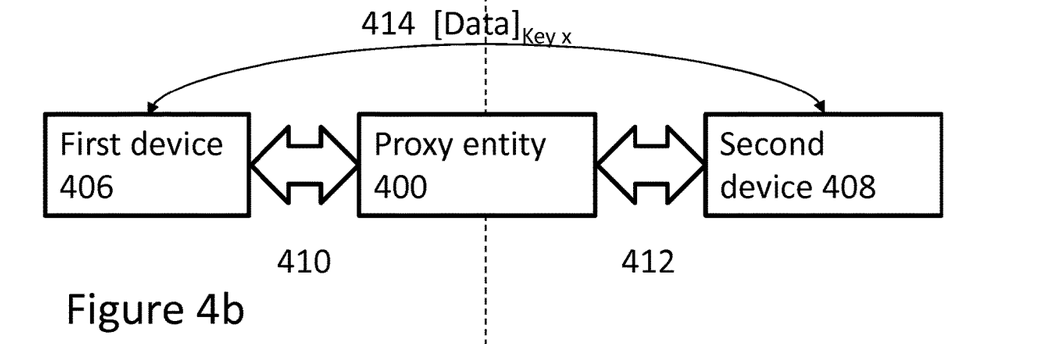

FIG. 2 is a flowchart that depicts a method according to the second aspect and related embodiments for establishing secure communication, where the proxy entity is visible to both the first and the second device but only secure communications such as key provisioning for encryption, decryption and/or authentication between the first and second device take place via the proxy entity. Once the keys are negotiated/generated and provisioned/installed, subsequent communication takes place securely with the provisioned keys using a wireless communication network. A system for implementing FIG. 2 is seen in FIG. 4b and this system is also discussed herein.

As discussed above, the second aspect of the present disclosure provides a method of establishing a secure communication session between a first device 406 and a second device 408. In FIG. 2, the first device 406 is a low order device operating in a user network 402, such as an IoT network and implementing a first key exchange protocol 410 for secure communication. This may be a lightweight cryptographic protocol for negotiating and provisioning/installing keys for authentication/encryption/decryption etc. The second device 408 is capable of communicating with the first device 406 and other devices in the user network over a wireless communication network 404, such as the Internet. In the embodiment shown in FIG. 2, the first device 406 is compatible with one or more communication protocols associated with the wireless communication network 404, but is unable to implement secure communications for key negotiation or provisioning using the second key exchange protocol 412 or any other secure cryptographic protocol associated with the wireless communication network 404 without placing a significant burden on the processing, power and network bandwidth resources associated with the first device 406. The second device 408 may be a high order device such as an Internet server or a key management server that implements a second key exchange protocol 412 that is different to the first key exchange protocol 410 for secure communication. The second key exchange protocol 410 may be an Internet related security protocol such as TLS or SSL or HTTPS for secure data or key negotiation or exchange. A proxy entity 400 is shown in FIG. 2 at the boundary of the user network 402 and the wireless communication network 404.

In step 202, the proxy entity 400 is configured for implementing both the first 410 and the second key exchange 412 protocols for secure communication. The proxy entity 400 is also configured for implementing the remaining steps of FIG. 2.

In step 204, a first device key is negotiated for the first device 406 using the first key exchange protocol 410 and a second device key is negotiated for the second device 408 using the second key exchange protocol 412. The device keys in FIG. 2 are used for encrypting all communications taking place between the proxy entity 400 and the respective devices 406,408 using the first and second key exchange protocols 410,412. The first and second device keys are not depicted in FIG. 4b, but they may be keys for known cryptographic mechanisms such as integer or non-integer symmetric or asymmetric keys that are suitable for the respective key exchange protocols 410,412.

In step 206, a request encrypted with the second device key is sent to the second device 408 using the second key exchange protocol 412, the request including a request for establishing a secure communication session with the first device 406. The request is sent in response to the proxy entity 400 receiving a request from the first device 406 for establishing a secure session for future communication.

In step 208, a session key, key X, encrypted with the second device key is negotiated from the second device 408 using the second key exchange protocol 412, the session key being associated with the first device 406. The association may be based on device related information that may be present in the request that originated from the first device 406. The session key X is generated at the second device 408. The generation may be carried out using one or more known methods such as those involving random number generation or secure key seeds for calculation of one or more predefined formulae based on information that may be provided to the second device 408. In some examples, key X may be computed using information based on the first device 406 that may be available in the request from the proxy entity 400 in step 206. This is to ensure additional security of the session key X against any malicious attacks or eavesdropping by a third party or device at the proxy entity 400 or the second device 408.

In step 210, the session key X is decrypted using the second device key and then re-encrypted using the first device key. This is done to ensure that all communication relating to provisioning the keys for the devices 406,408 are secured using the key exchange protocol 410,412 specific to the given device.

In step 212, the session key X encrypted with the first device key is sent using the first key exchange protocol 410 to the first device 406.

In step 214, a secure communication session 414 is then established over the wireless communication network 404 for data transfer between the first device 406 and the second device 408 using the session key X. Thus, the session key X is pushed to the first device 406 and is already available to the second device 408 where it was generated. Thus, in FIG. 2 all subsequent data transferred between the first and second devices 406,408 is end to end encrypted using key X. The data transferred using session 414 may carried out using any communication protocol associated with the wireless communication network 404 that is compatible with the devices 406,408 and there is no need to use the first and second key exchange protocol 410,412 or any other cryptographic protocol, as the session key X has already been established and provisioned.

Figure 3A:
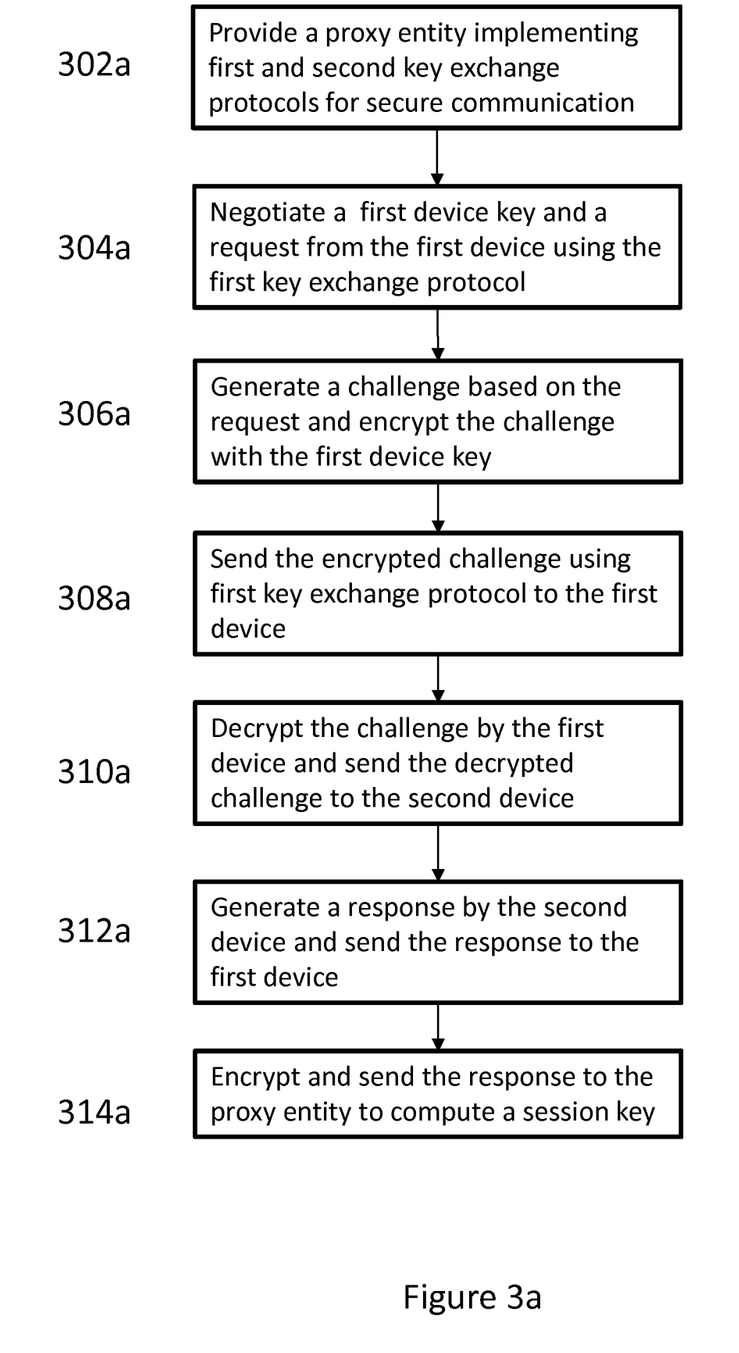
FIG. 3a is a flowchart illustrating a method for key negotiation in user network according to one implementation of the third aspect.
Figure 3B:
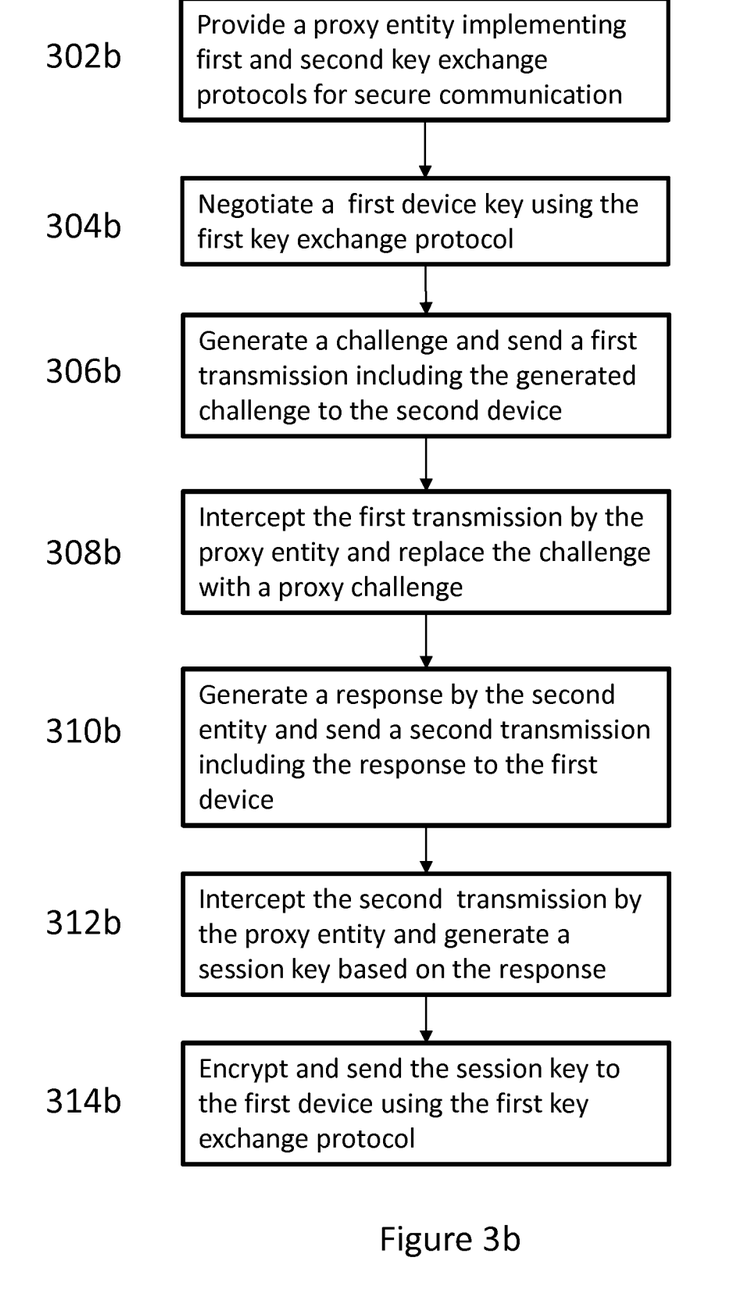
FIG. 3b is a flowchart illustrating a method for key negotiation in a user network according to another implementation of the third aspect.
Figure 4C:
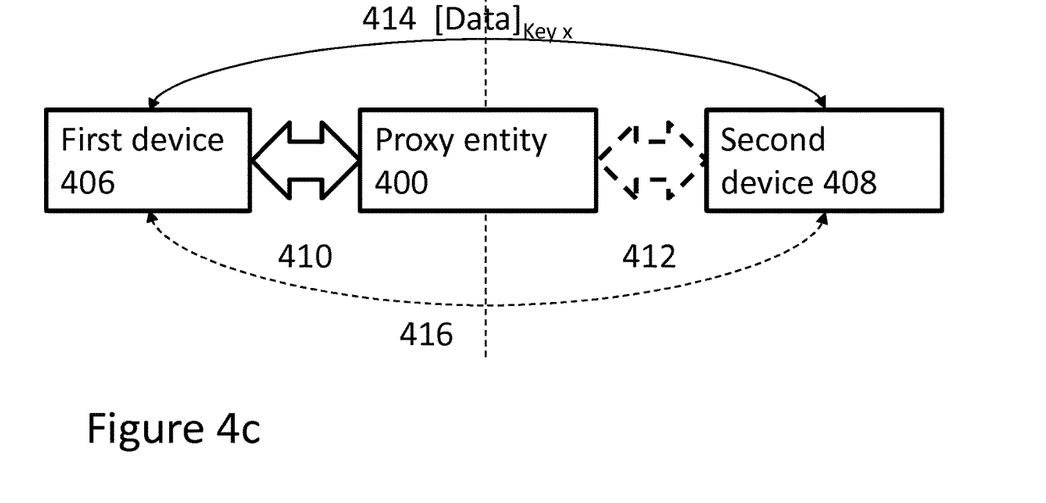

FIGS. 3a and 3b are flowcharts that depict a first and a second implementation of the third aspect, respectively, for establishing secure communication, where the proxy entity is visible to the first device and is invisible to the second device and where only secure communications such as key provisioning for encryption, decryption and/or authentication between the first and second device take place using the proxy entity. Once provisioned, subsequent communication takes place securely using the provisioned keys via a wireless communication network. A system for implementing FIGS. 3a and 3b is seen in FIG. 4c and this system is also discussed herein.

As discussed above, the third aspect of the present disclosure provides a method of establishing a secure communication session between a first device 406 and a second device 408. In FIGS. 3a and 3b, the first device 406 is a low order device operating in a user network 402, such as an IoT network, and implementing a first key exchange protocol 410 for secure communication. This may be a lightweight cryptographic protocol for negotiating and provisioning/installing keys for authentication/encryption/decryption etc. The second device 408 is capable of communicating with the first device 406 and other devices in the user network over a wireless communication network 404, such as the Internet. In the embodiments shown in FIGS. 3a and 3b, the first device 406 is compatible with one or more communication protocols associated with the wireless communication network 404, but is unable to implement secure communications for key establishment or provisioning using the second key exchange protocol 412 or any other secure cryptographic protocol associated with the wireless communication network 404 without placing a significant burden on the processing, power and network bandwidth resources associated with the first device 406. The second device 408 may be a high order device such as an Internet server or a key management server that implements a second key exchange protocol 412 that is different to the first key exchange protocol 410 for secure communication. The second key exchange protocol 410 may be an Internet related security protocol such as TLS or SSL or HTTPS for secure data or key installation or exchange. A proxy entity 400 is shown in FIGS. 3a and 3b at the boundary of the user network 402 and the wireless communication network 404 and is not known to or is invisible to the second device 408. Thus, only the first device 406 in the user network 402 can directly address the proxy entity 400 for key establishment and other secure communications.

Referring first to the implementation shown in FIG. 3a, in step 302a the proxy entity 400 is configured for implementing both the first 410 and the second key exchange 412 protocols for secure communication.

In step 304a a first device key is obtained for the first device 406 using the first key exchange protocol 410. The first device key is used for encrypting all communications taking place between the proxy entity 400 and the first device 406 using the first key exchange protocol 410. The first device key is not depicted in FIG. 3a, but may be a key for known cryptographic mechanisms such as integer or non-integer symmetric or asymmetric keys associated with the first key exchange protocol 410. Also, in addition to the first device key, the proxy entity 410 also receives a request using the first key exchange protocol 410, the request being a request to the proxy entity 400 for generating a challenge for the second device 408. As mentioned above the challenge requested may be part of a challenge-response authentication process, where a simple example is a challenge-response protocol based on password authentication, i.e. the challenge is asking for the password and the valid response is the correct password. Another example of a challenge-response authentication allows a different challenge to be issued each time for the same device by providing a code or algorithm to the other device to which the challenge is directed to (here it is the second device) so that a different response that is valid or fits the challenge can be generated. The code or algorithm may be provided to both devices prior to issuance of the challenge.

In step 306a, the proxy entity 400 generates a challenge for the second device 408, i.e. the challenge is meant for or directed to the second device 408. The proxy entity 400 then encrypts the challenge with the first device key.

In step 308a, the proxy entity sends the encrypted challenge to the first device 406 using the first key exchange protocol 410.

In step 310a, the first device 406 decrypts the challenge using the first device key and sends, i.e. forwards, the decrypted challenge to the second device 408 using the wireless communication network 404. The decrypted challenge may be sent over a wireless communication link 416. This communication link 416 does not need to use a cryptographic protocol as there are no keys to be transferred or provisioned as yet. Any communication protocol associated with the wireless communication network can be used as long as it is compatible with both the first and the second devices 406,408.

In step 312a, assuming that the second device 408 has been validly provided with data for generation of a valid response, such as upon registration with the wireless communication network 404 (otherwise, the second device is treated as an imposter and no further communication may be sent to it), the second device 408 generates and send a response to the challenge back to first device 406 using the same wireless communication link 416.

In step 314a, the first device 406 encrypts the response using the first device key and sends the encrypted response to the proxy entity 400 using the first key exchange protocol 410. Upon receipt of the encrypted response, the proxy entity 400 decrypts the encrypted response using the first device key and generates a session key X based on the response. The session key X is then encrypted by the proxy entity 400 with the first device key and sent to the first device 406 using the first key exchange protocol 410. The session key X is then decrypted at the first device 406.

Referring now to the second implementation shown in FIG. 3b, in step 302b, the proxy entity 400 is configured for implementing both the first 410 and the second key exchange 412 protocols for secure communication.

In step 304b, a first device key is obtained for the first device 406 using the first key exchange protocol 410. The first device key is used for encrypting all communications taking place between the proxy entity 400 and the first device 406 using the first key exchange protocol 410. The first device key is not depicted in FIG. 3b, but may be a key for known cryptographic mechanisms such as integer or non-integer symmetric or asymmetric keys suitable for the first key exchange protocol 410.

In step 306b, the first device 406 generates a challenge for the second device 408, i.e. the challenge meant for or directed to the second device 408 and includes the challenge in a first transmission to be sent to the second device. As mentioned above, the challenge requested may be part of a challenge-response authentication. The first transmission may be sent over a wireless communication link 416 associated with the wireless communication network 404. This communication link 416 does not need to use a cryptographic protocol, as there are no keys to be transferred or provisioned as yet. Any communication protocol associated with the wireless communication network 404 can be used as long as it is compatible with both the first and the second devices 406,408.

In step 308b, the proxy entity 400 intercepts the first transmission and replaces the challenge with a proxy challenge that is generated at the proxy entity 400 on behalf of the first device 406. This to so that the proxy entity can now take control of the challenge-response authentication process for the first device 406 using secure protocols that the first device 406 is unable to property implement or handle. This replacement is done before the first transmission reaches the second device 408.

In step 310b, assuming that the second device 408 has been provided with data for generation of a valid response, such as upon registration with the wireless communication network 404, the second device 408 generates and send a response to the proxy challenge back to first device 406 in a second transmission using the same wireless communication link 416.

In step 312b, the proxy entity 400 intercepts the second transmission and extracts the response. The proxy entity then generates a session key X based on the response.

In step 314b, the session key X is encrypted by the proxy entity 400 using the first device key and sent to the first device 406 using the first key exchange protocol 410. The session key can then be decrypted at the first device 406.

For the implementation in both FIGS. 3a and 3b, a secure communication session 414 as shown in FIG. 4c is then established over the wireless communication network 404 for subsequent data transfer between the first device 406 and the second device 408 using the session key X. Thus, the session key X is pushed to the first device 406 and may be already available to the second device 408 which computed the response to the challenge/proxy challenge. For example, in some embodiments the proxy entity 400 is configured to send the generated session key X using the second key exchange protocol 412 to the second device 408. In related embodiments, this may be done using a public key associated with the second device over a unidirectional or a bidirectional link implemented based on the second key exchange protocol 412.

Thus, in FIGS. 3a and 3b all subsequent data transferred between the first and second devices 406,408 is end to end encrypted using key X. The data transferred using session 414 may carried out using any communication protocol associated with the wireless communication network 404 that is compatible with the devices 406,408 and there is no need to use the first and second key exchange protocol 410,412 or any other cryptographic protocol as the session key X has already been negotiated/established and provisioned.

Figure 5:
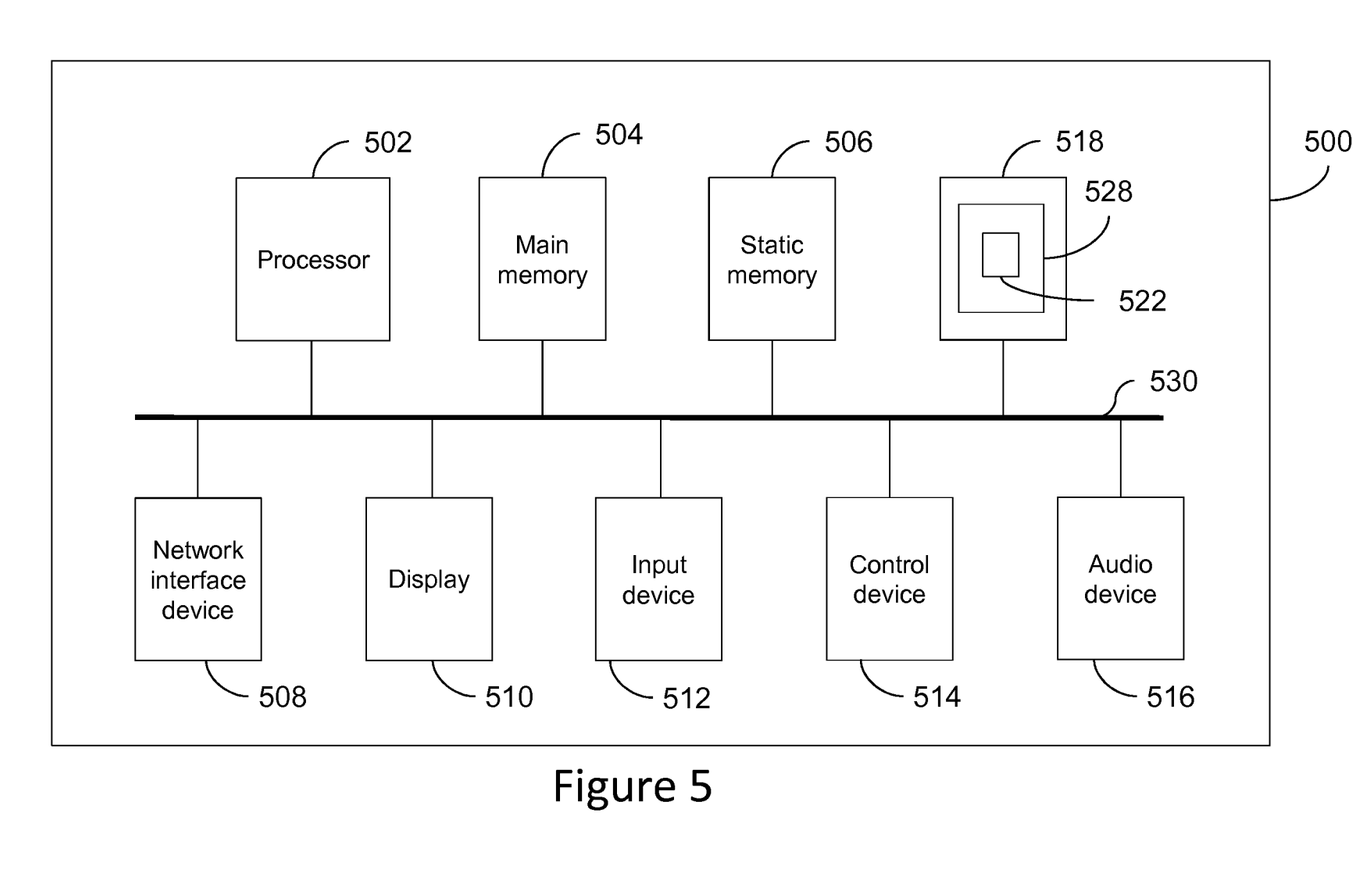
FIG. 5 is an illustration of an example computing device suitable for implementing aspects and embodiments of the present disclosure.

FIG. 5 illustrates a block diagram of one implementation of a computing device 500 within which a set of instructions, for causing the computing device to perform any one or more of the methodologies discussed herein, may be executed. In alternative implementations, the computing device 500 may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. For example, the computing device may be the proxy entity or the first/second device or the control server of the user network or any other device in the user network. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 500 includes a processing device 502, a main memory 504 (e.g., read-only memory (ROM), flash memory, dynamic random-access memory (DRAM) such as synchronous DRAM (SDRAM) or Rambus DRAM (RDRAM), etc.), a static memory 506 (e.g., flash memory, static random-access memory (SRAM), etc.), and a secondary memory (e.g., a data storage device 518), which communicate with each other via a bus 530.

Processing device 502 represents one or more general-purpose processors such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. Processing device 502 is configured to execute the processing logic (instructions 522) for performing the operations and steps discussed herein.

The computing device 500 may further include a network interface device 508. The computing device 500 also may include a video display unit 510 (e.g., a liquid crystal display (LCD) or a cathode ray tube (CRT)), an alphanumeric input device 512 (e.g., a keyboard or touchscreen), a cursor control device 514 (e.g., a mouse or touchscreen), and an audio device 516 (e.g., a speaker).

The data storage device 518 may include one or more machine-readable storage media (or more specifically one or more non-transitory computer-readable storage media) 528 on which is stored one or more sets of instructions 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid-state memory, magnetic tape, a removable computer diskette, a random-access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "sending", "providing", "generating", "computing," "receiving", "identifying", "detecting", "establishing", "obtaining", "storing", "replacing", "encrypting", "decrypting" or the like, refer to the actions and processes of a computer system, or similar electronic computing device, that manipulates and transforms data represented as physical, electronic, quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the disclosure has been described with reference to specific example implementations, it will be recognized that the disclosure is not limited to the implementations described but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

The invention claimed is:

1. A method for communication, the method comprising:
negotiating, by a proxy entity configured for implementing a first key exchange protocol and a second key exchange protocol for secure communication, a first device key for a first device using the first key exchange protocol, the first device configured to operate in a user network and to implement the first key exchange protocol for secure communication;
negotiating, by the proxy entity, a second device key for a second device using the second key exchange protocol, the second device configured to implement a second key exchange protocol that is different to the first key exchange protocol for secure communication, and the second device configured to communicate with the first device using a wireless communication network;
computing, by the proxy entity, a first session key for the first device;
computing, by the proxy entity, a second session key for the second device;
receiving data, by the proxy entity from the first device, the data encrypted with the first session key;
decrypting, by the proxy entity, the data using the first session key;
re-encrypting, by the proxy entity, the data using the second session key;
sending, by the proxy entity, the data encrypted, with the second session key, to the second device;
receiving further data, by the proxy entity from the second device, the further data encrypted with the second session key;
decrypting, by the proxy entity, the further data using the second session key;
re-encrypting, by the proxy entity, the further data, encrypted with the first session key, to the first device.

2. The method of claim 1, wherein the secure communication for the first device, the second device and/or the proxy entity is a communication for provisioning data, keys, or codes required for authentication or cryptography, and wherein each of first device, the second device and the proxy entity is configured for other communications using the wireless communication network based on one or more communication protocols associated with the wireless communication network.

3. The method of claim 1, wherein the second device is operating in the user network, or wherein the second device is operating outside the user network.

4. The method of claim 1, wherein the first device is a low order device and the first key exchange protocol is a lightweight cryptographic protocol comprising one or more of a stream cipher, a block cipher or a hash function.

5. The method of claim 1, wherein the proxy entity is integrated within the user network, or wherein the proxy entity operates outside the user network.

6. The method of claim 1, wherein the first device is incompatible for operation with second key exchange protocol, wherein the second device is incompatible for operation with the first key exchange protocol for secure communication, and wherein the first device is incompatible with at least one communication protocol associated with the wireless communication network.

7. The method of claim 1, wherein the second device is a high order device and the second key exchange protocol is an Internet related cryptographic security protocol comprising one or more of a Transport Layer Security,: TLS, or Secure Sockets Layer, SSI or Hypertext Transfer Protocol Secure HTTPS.

8. A method of establishing a secure communication session between a first device and a second device the method comprising:
obtaining, by a proxy entity configured for implementing a first key exchange protocol and a second key exchange protocol for secure communications, a first device key for the first device using the first key exchange protocol, the first device configured to operate in a user network and implement a first key exchange protocol for secure communication;
generating, by the proxy entity, a challenge for the second device, the challenge associated with the first device, the second device configured to communicate with the first device over a wireless communication network and to implement a second key exchange protocol that is different to the first key exchange protocol for secure communication;
providing the challenge to the second device using the wireless communication network;
obtaining, by the proxy entity, a response to the challenge from the second device;
generating, by the proxy entity, a session key based on the response;
encrypting by the proxy entity, the generated session key using the first device key; and sending the encrypted session key to the first device using the first key exchange protocol, wherein the first device is configured to decrypt the encrypted session key using the first device key, and wherein at least one of the first device or the second device is configured to establish a secure communication session over the wireless communication network for data transfer between the first device and the second device using the session key.

9. The method of claim 8, further comprising:

receiving by the proxy entity from the first device using the first key exchange protocol, a request for generating the challenge for the second device;

generating by the proxy entity the challenge for the second device and encrypting the challenge with the first device key;

sending by the proxy entity the encrypted challenge to the first device using the first key exchange protocol;

decrypting the challenge by the first device using the first device key and sending the decrypted challenge to the second device using the wireless communication network;

generating by the second device the response to the challenge and sending the response to first device using the wireless communication network;

encrypting the response by the first device using the first device key, and sending the encrypted response to the proxy entity using the first key exchange protocol; and decrypting by the proxy entity the encrypted response using the first device key and generating the session key based on the response.

10. The method of claim 8, further comprising:

generating by the first device a first challenge for the second device and sending a first transmission including the first challenge to the second device using the wireless communication network, wherein communication between the first device and the second device over the wireless communication network is intercepted by the proxy entity;

detecting by the proxy entity the first challenge in the first transmission and generating a proxy challenge for the second device;

replacing by the proxy entity the first challenge with the proxy challenge in the first transmission before it reaches the second device;

generating by the second device a response to the proxy challenge and sending a second transmission including the response to first device using the wireless communication network; and detecting by the proxy entity the response in the second transmission and generating the session key based on the detected response from the second device.

11. The method any of claim 8, wherein establishing the secure communication session includes encrypting and decrypting subsequent data transmitted between the first device and the second device using the wireless communication network with the session key, wherein said secure communication session is established using an Internet related communication protocol.

12. The method of claim 8, wherein the first device is compatible for operation with second key exchange protocol for an unoptimized or limited duration, or for an unoptimized or limited type(s) of secure communication, or for a specific type(s) of data or keys exchanged during the secure communication.

13. A proxy entity configured for implementing a first key exchange protocol and a second key exchange protocol for secure communication, the proxy entity comprising:

at least one memory storing instructions; and at least one processor coupled to the at least one memory and configured to execute the instructions to:

negotiate a first device key for a first device using the first key exchange protocol, the first device configured to operate in a user network and to implement the first key exchange protocol for secure communication;

negotiate a second device key for a second device using the second key exchange protocol, the second device configured to implement a second key exchange protocol that is different to the first key exchange protocol for secure communication, and the second device configured to communicate with the first device using a wireless communication network;

compute a first session key for the first device;

compute a second session key for the second device;

receive data from the first device, the data encrypted with the first session key;

decrypt the data using the first session key;

re-encrypt the data using the second session key;

send the data, encrypted with the second session key, to the second device;

receive further data from the second device, the further data encrypted with the second session key;

decrypt the further data using the second session key;

re-encrypt the further data using the first session key; and send the further data, encrypted with the first session key, to the first device.

14. The proxy entity of claim 13, wherein the secure communication for the first device, the second device and/or the proxy entity is a communication for provisioning data, keys, or codes required for authentication or cryptography, and wherein each of first device, the second device and the proxy entity is configured for other communications using the wireless communication network based on one or more communication protocols associated with the wireless communication network.

15. The proxy entity of claim 13, wherein the second device is operating in the user network, or wherein the second device is operating outside the user network.

16. The proxy entity of claim 13, wherein the first device is a low order device and the first key exchange protocol is a lightweight cryptographic protocol comprising one or more of a stream cipher, a block cipher or a hash function.

17. The proxy entity of claim 13, wherein the second device is a high order device and the second key exchange protocol is an Internet related cryptographic security protocol comprising one or more of a Transport Layer Security,: TLS, or Secure Sockets Layer, SSl or Hypertext Transfer Protocol Secure HTTPS.

18. The proxy entity of claim 13, wherein the proxy entity is integrated within the user network, or wherein the proxy entity operates outside the user network.

19. The proxy entity of claim 13, wherein the first device is incompatible for operation with second key exchange protocol, wherein the second device is incompatible for operation with the first key exchange protocol for secure communication, and wherein the first device is incompatible with at least one communication protocol associated with the wireless communication network.

* * * * *